US010681412B2

(12) United States Patent
Pullela et al.

(10) Patent No.: US 10,681,412 B2
(45) Date of Patent: Jun. 9, 2020

(54) METHOD AND SYSTEM FOR FULL SPECTRUM CAPTURE SAMPLE RATE ADAPTATION

(71) Applicant: MaxLinear, Inc., Carlsbad, CA (US)

(72) Inventors: Raja Pullela, Irvine, CA (US); Glenn Chang, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 13/857,778

(22) Filed: Apr. 5, 2013

(65) Prior Publication Data

US 2013/0268979 A1 Oct. 10, 2013

Related U.S. Application Data

(60) Provisional application No. 61/620,738, filed on Apr. 5, 2012.

(51) Int. Cl.
| | | |
|---|---|---|
| *H04N 21/442* | (2011.01) | |
| *H04N 21/438* | (2011.01) | |
| *H04H 40/90* | (2008.01) | |
| *H04N 7/10* | (2006.01) | |
| *H04N 21/643* | (2011.01) | |
| *H04N 7/20* | (2006.01) | |
| *H04N 21/61* | (2011.01) | |
| *H04N 21/436* | (2011.01) | |

(52) U.S. Cl.
CPC ...... *H04N 21/44209* (2013.01); *H04H 40/90* (2013.01); *H04N 7/106* (2013.01); *H04N 7/20* (2013.01); *H04N 21/4381* (2013.01); *H04N 21/43615* (2013.01); *H04N 21/6143* (2013.01); *H04N 21/64322* (2013.01)

(58) Field of Classification Search
CPC .................................................. H04N 21/442
USPC ............................................................ 725/68
See application file for complete search history.

(56) References Cited

U.S. PATENT DOCUMENTS

| | | | | |
|---|---|---|---|---|
| 6,295,325 B1 * | 9/2001 | Farrow | ................. | H04L 7/0278 |
| | | | | 375/327 |
| 7,259,547 B1 * | 8/2007 | Summers | ........... | G01R 19/2509 |
| | | | | 324/141 |
| 7,542,715 B1 * | 6/2009 | Gurantz | ................. | H04H 40/90 |
| | | | | 455/179.1 |
| 2005/0002473 A1 * | 1/2005 | Kloper | ................... | G01R 23/16 |
| | | | | 375/316 |

(Continued)

*Primary Examiner* — Jefferey F Harold
*Assistant Examiner* — Justin B Sanders
(74) *Attorney, Agent, or Firm* — Maschoff Brennan (57) ABSTRACT

An electronic device may be operable to sample a signal during an analog-to-digital conversion using an analog-to-digital converter in the electronic device, and the signal may comprise a wide bandwidth and a plurality of channels. The electronic device may adaptively change a sample rate of the sampling to move aliasing out of a region of one or more desired channels of the plurality of channels. The electronic device may change the sample rate using a variable oscillator in the electronic device. The change of the sample rate may comprise, for example, increasing or decreasing the sample rate by a particular percentage. In response to the change of the sample rate, the electronic device may perform, using a variable rate interpolator in the electronic device, variable rate interpolation. The variable rate interpolator may comprise, for example, a finite impulse response filter.

22 Claims, 5 Drawing Sheets

(56) References Cited

U.S. PATENT DOCUMENTS

| | | | | |
|---|---|---|---|---|
| 2006/0262222 | A1* | 11/2006 | Monnier | H04N 21/4344 348/572 |
| 2008/0225182 | A1* | 9/2008 | Silver | H04N 5/4401 348/726 |
| 2012/0129480 | A1* | 5/2012 | Ruelke | H04B 1/0021 455/296 |
| 2012/0310601 | A1* | 12/2012 | Martin | G01R 13/0272 702/190 |
| 2012/0320948 | A1* | 12/2012 | McGowan | H04L 27/2624 375/133 |
| 2013/0039444 | A1* | 2/2013 | Porret | H04B 1/006 375/316 |

* cited by examiner

METHOD AND SYSTEM FOR FULL SPECTRUM CAPTURE SAMPLE RATE ADAPTATION

CROSS-REFERENCE TO RELATED APPLICATIONS/INCORPORATION BY REFERENCE

This patent application makes reference to, claims priority to, and claims benefit from U.S. Provisional Application Ser. No. 61/620,738, which was filed on Apr. 5, 2012.

This application also makes reference to:
U.S. patent application Ser. No. 13/356,265 filed on Jan. 23, 2012.

Each of the above stated applications is hereby incorporated herein by reference in its entirety.

FIELD OF THE INVENTION

Certain embodiments of the invention relate to wireless communication. More specifically, certain embodiments of the invention relate to a method and system for full spectrum capture sample rate adaptation.

BACKGROUND OF THE INVENTION

In signal processing, aliasing may refer to an effect that causes different signals to become aliases of one another and may occur in signals when sampled in time. Aliasing (or aliased signal) may fall within the band of interest and may block, for example, one or more desired channels in the signal.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for full spectrum capture sample rate adaptation, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and, code (if any is necessary) to perform the function, regardless of whether performance of the function is disabled, or not enabled, by some user-configurable setting.

Certain embodiments of the invention can be found in a method and system for full spectrum capture sample rate adaptation. In various embodiments of the invention, an electronic device may be operable to sample a signal during an analog-to-digital conversion using an analog-to-digital converter (ADC) in the electronic device, and the signal may comprise a wide bandwidth and a plurality of channels. The electronic device may be operable to adaptively change a sample rate of the sampling to move aliasing out of a region of one or more desired channels of the plurality of channels. In this regard, the electronic device may be operable to change the sample rate using a variable oscillator in the electronic device. The change of the sample rate may comprise, for example, increasing or decreasing the sample rate by a particular percentage. In response to the change of the sample rate, the electronic device may be operable to perform, using a variable rate interpolator in the electronic device, variable rate interpolation. In this regard, the variable rate interpolator may comprise, for example, a finite impulse response (FIR) filter.

In an exemplary embodiment of the disclosure, the sampling of the signal may comprise, for example, an oversampling. The wide bandwidth of the signal may be, for example, approximately 1 gigahertz (GHz). A bandwidth of each of the plurality of channels may be, for example, approximately in the range of 6 to 45 megahertz (MHz).

In an exemplary embodiment of the disclosure, the signal may comprise, for example, a satellite television signal, and the electronic device may comprise, for example, an Internet protocol low noise block downconverter (IP-LNB).

In an exemplary embodiment of the disclosure, the electronic device may be operable to identify, continuously or periodically, the one or more desired channels. The electronic device may be operable to perform, continuously or periodically, spectrum analysis of the wide bandwidth to monitor signal powers at all frequencies within the wide bandwidth. Based on a result of the spectrum analysis, the aliasing due to the sampling may be determined or identified by the electronic device. The electronic device may adaptively change, based on the determination of the aliasing, the sample rate of the sampling to move the aliasing out of the region of the one or more desired channels.

Figure 1:
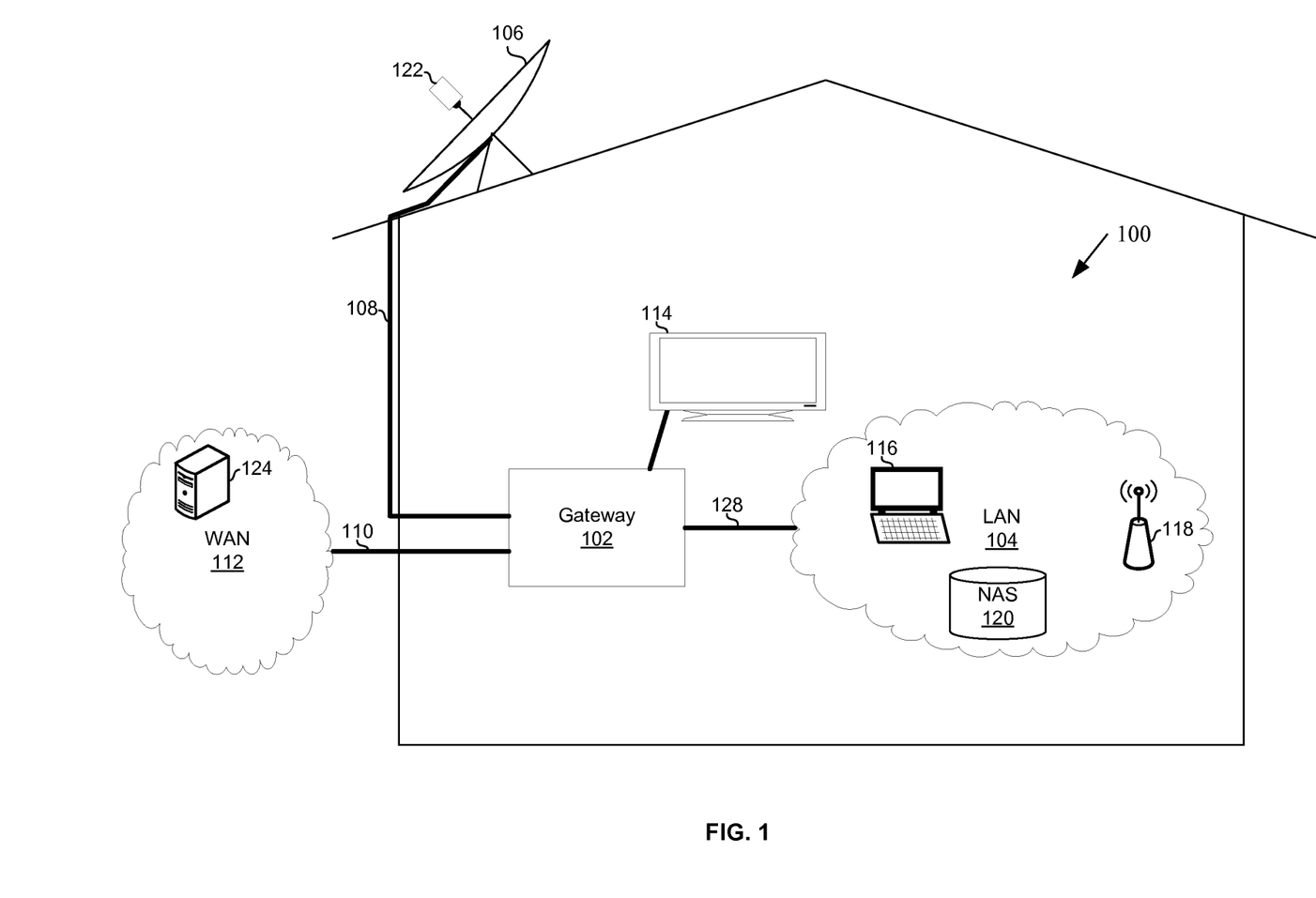
FIG. 1 is a block diagram illustrating an exemplary network comprising satellite television components, local area network components, and wide area networking components, in accordance with an embodiment of the invention.

FIG. 1 is a block diagram illustrating an exemplary network comprising satellite television components, local area network components, and wide area networking components, in accordance with an embodiment of the invention. Referring to FIG. 1, there is shown a system which comprises an exemplary in-premises (or in-home) network 100, a satellite dish 106 comprising a module or electronic device 122, a wide area network (WAN) 112 comprising one or more servers 124, a network link 108 connecting the dish 106 and the in-premises network 100, and a link 110 connecting the in-home network 100 and the WAN 112. The exemplary in-home network 100 comprises a gateway 102, a television 114, and a local area network (LAN) 104.

The satellite dish 106 may comprise circuitry operable to receive satellite signals and output the received signals to the gateway 102 via the communication link 108. The electronic device 122 may, for example, comprise an Internet Protocol low noise block-downconverter (IP-LNB) 122 described below with respect to FIGS. 2B and 2C.

Each of the communication links 108 and 110 may comprise one or more wired, wireless, and/or optical links. The communication link 108 may comprise, for example, a coaxial cable and/or a 60 GHz wireless link which carries physical layer symbols in accordance with, for example, Multimedia over Coax Alliance (MoCA) or Ethernet standards. The communication link 110 may comprise, for example, a coaxial cable or Cat-5e cable which carries physical layer symbols in accordance with, for example, DSL or Ethernet standards.

The gateway 102 may comprise circuitry operable to receive satellite signals, process the received signals to recover data, and output the data to an end-user device such as the television 114. The gateway 102 may also comprise circuitry operable to transmit and/or receive data over the communication links 110, 128, and/or 108. Communications over the link 128 and/or 108 may be in accordance with, for example, Multimedia over Coax Alliance (MoCA) and/or Ethernet standards. Communication over the link 100 may be in accordance with, for example, CATV/DOCSIS or DSL standards. The gateway 102 may, for example, be a stand-alone unit or may be integrated with a television set-top box (STB) or other device of the network 100.

The television 114 may comprise circuitry operable to receive media and control data via one or more point-to-point media links (e.g., HDMI), process the received data to recover audio and/or video, and present the audio and/or video to a viewer.

The WAN 112 may comprise, for example, a DSL (or cable) headend and associated circuitry and/or devices. Such devices may include one or more servers 124 which are operable to communicate with the gateway 102 to communicate general IP traffic and/or to communicate control information pertaining to satellite television communications. For example, the server 124 may establish a secure connection to the gateway 102 to exchange security keys for decrypting and/or descrambling signals received via the dish 106. The communication link between a satellite television content provider and the network 100 via the satellite dish 106 and communication link 108 may, for example, be completely or partially independent of the WAN and communication link 110.

The LAN 104 may comprise any number and/or type of networking devices. Exemplary devices shown include a computer 116, network attached storage 120, and a wireless access point (WAP) 118. The devices of the LAN 104 may communicate utilizing, for example, MoCA and/or Ethernet protocols.

In operation, the dish 106 may receive one or more satellite television signals, each of which may comprise of one or more channels. The signals may be processed by the IP-LNB 122 and/or gateway 102 to recover one or more of the channels carried in the received signals. The signals that are processed by one or more components of the IP-LNB 122 and/or gateway 102 may be determined based on which channels are selected for consumption (e.g., which television channels are selected for viewing) by one or more devices of the network 100 (e.g., the television 114). The processing of the received signal(s) to recover the selected channel(s) may comprise downconverting and amplifying the received one or more signals to generate a corresponding one or more intermediate frequency (IF) signals.

The IF signals may then be processed via one or more of a plurality of signal paths, where different ones of the signal paths may have different characteristics (e.g., different paths may have different bandwidths and power consumption). Each of the signal paths may comprise, for example, a mixer, a filter, and an analog-to-digital converter (ADC). In this regard, for example, at least one path ("wideband path" or "broadband path") of the signal paths may be configured for capturing and processing a signal comprising a wide bandwidth and a plurality of channels. This operation may be referred to as full spectrum capture (FSC). On the other hand, one or more other signal paths ("narrowband paths") may each be configured for processing a channel with a narrow bandwidth, for example. The wide bandwidth of the signal may be approximately 1 GHz, for example. The narrow bandwidth of each of the plurality of channels may be, for example, approximately in the range of 6 to 45 MHZ (e.g., 6 or 8 MHz for a television channel, 20-45 MHz for a satellite channel). The selection of which signal paths are utilized for recovering each of the selected channels may be performed with a goal of reducing the amount of power required to recover the selected channels.

In an exemplary embodiment of the disclosure, the signal, which comprises the wide bandwidth and a plurality of channels, may be sampled during an analog-to-digital conversion using an ADC in the wideband path. A sample rate of the sampling such as, for example, an oversampling, may be adaptively changed so as to move or push aliasing out of a region or range of one or more desired channels of the plurality of channels. The oversampling is a process of sampling a signal with a sample rate (sampling frequency) significantly higher than twice the bandwidth or highest frequency of the signal being sampled.

Figure 2A:
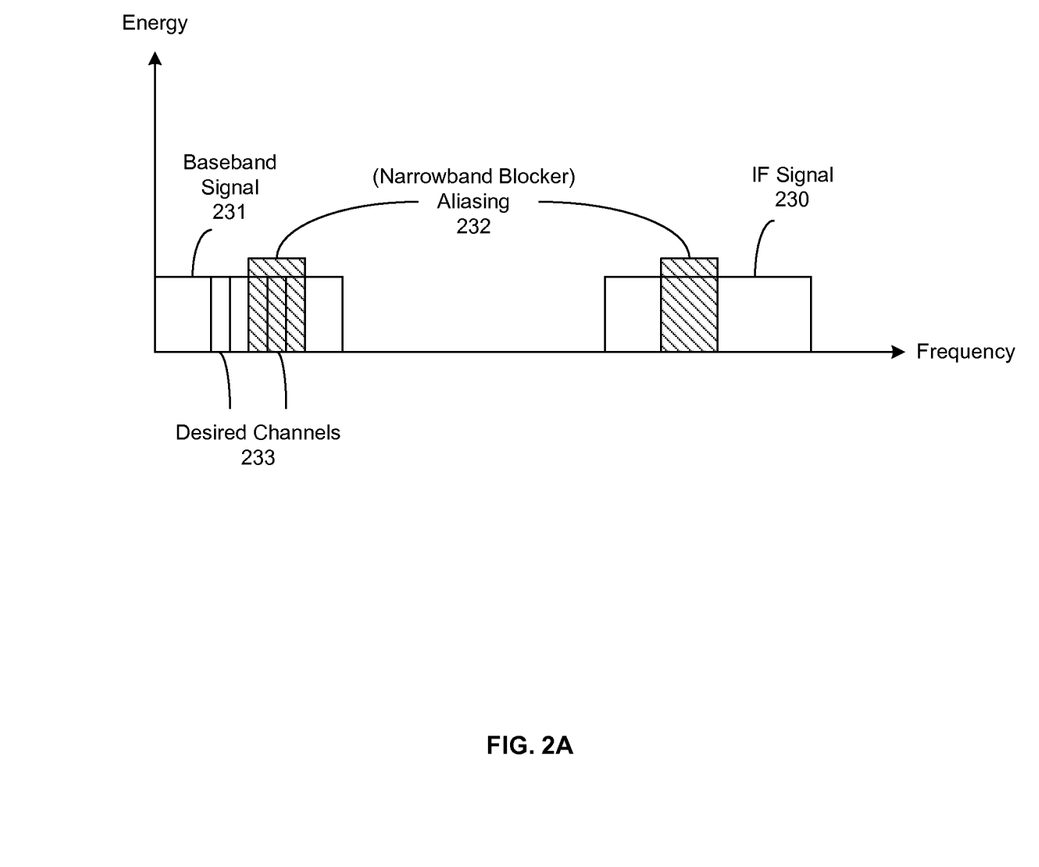
FIG. 2A is a diagram illustrating aliasing, in accordance with an embodiment of the invention.

FIG. 2A is a diagram illustrating aliasing, in accordance with an embodiment of the invention. Referring to FIG. 2A, there is shown an IF signal 230, a corresponding baseband signal 231 and an aliasing (aliased signal) 232. The signal 230 or 231 may comprise a wide bandwidth and a plurality of channels.

In an exemplary operation utilizing full spectrum capture (FSC), the entire bandwidth of the signal 230 may be captured and oversampled by a certain amount. At some point, due to the oversampling, the signal 230 may be aliased back into baseband. 231 as the aliasing or narrowband blocker 232. In such instances, for example, a narrowband blocker 232 such as a WiFi channel may be present in the region of one or more desired channels 233 (e.g., television or satellite channels). Accordingly, there may be a few distributed desired channels 233 and among them may be the narrowband blocker 232, for example.

Figure 2B:
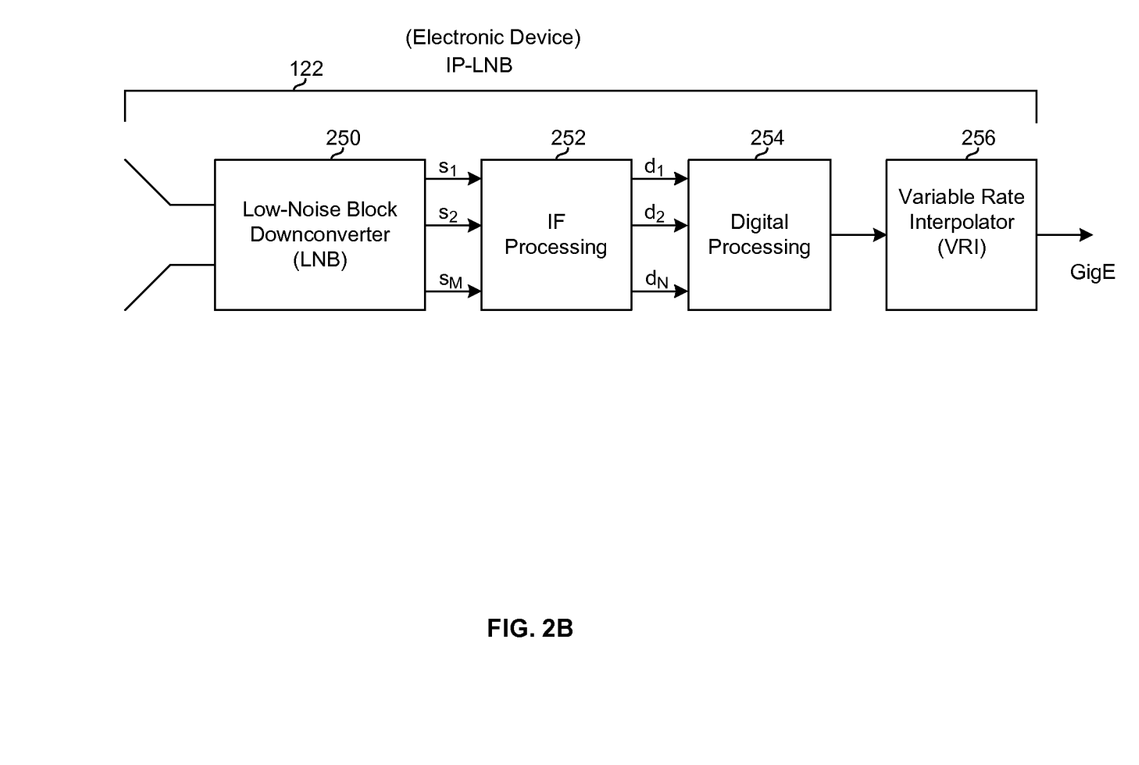
FIG. 2B is a block diagram illustrating an exemplary Internet protocol low noise block downconverter (IP-LNB), in accordance with an embodiment of the invention.

FIG. 2B is a block diagram illustrating an exemplary Internet protocol low noise block downconverter (IP-LNB), in accordance with an embodiment of the invention. Referring to FIG. 2B, there is shown the IP-LNB 122. The IP-LNB 122 may be as described with respect to FIG. 1, for example. The IP-LNB 122 may comprise a low-noise block-downconverter (LNB) 250, an IF processing module 252, a digital processing module 254, and a variable rate interpolator (VRI) 256. The LNB 250, the IF processing module 252, the digital processing module 254 and the variable rate interpolator (VRI) 256 may, for example, be integrated on a common substrate (e.g., a single silicon die).

The LNB 250 may comprise circuitry operable to receive RF satellite signals, and filter and amplify such signals to generate corresponding IF signals. The LNB 250 is illustrated outputting M (an integer number) of IF signals, labeled $s_1$ to $s_M$. Each of such IF signals may, for example, comprise IF signals in the 250 MHz to 2350 MHz range, each of which may correspond to a respective satellite signal (e.g., a satellite television signal).

The IF processing module 252 may comprise circuitry operable to amplify, downconvert, filter, and/or digitize at least a portion of the IF signals $s_1$-$s_M$ to generate digital signals $d_1$-$d_N$, where N is an integer. The portion(s) of the signals $s_1$ to $s_M$ that are digitized may depend on which channels in the signals $s_1$ to $s_M$ are selected by one or more devices of the network 100. In this regard, the IF processing module 252 may be configured based on which channels in the signals $s_1$ to $s_M$ are selected by one or more devices of the network 100. The configuration of the IF processing module 252 may be performed to optimize power consumption versus performance of the IF processing module 252. The IF processing module 252 may be configured via one or more control signals from the digital processing module 254.

The exemplary IF processing module 252 may comprise M modules (M is an integer) corresponding to M number of IF signals which can be concurrently processed. Each of the M modules (not shown) may comprise, for example, an amplifier, a multiplexer and one or more of a plurality of signal processing paths. In an exemplary embodiment, the amplifier may be configurable between two modes of operation: a "wideband mode" in which it provides at least a threshold amount of gain over a larger bandwidth (e.g., 1.0 or 1.2 GHz or 2.0 GHz), and a "narrowband mode" in which it provides at least a threshold amount of gain over a smaller bandwidth (e.g., 6, 8, or 20, or 45 MHz). The multiplexer may be operable to provide signal-routing to one or more of the plurality of signal processing paths. The plurality of signal processing paths may correspond to the narrowband paths and the wideband path described above. Additional details of the IF processing module 252 are described below with respect to FIG. 2C.

The digital processing module 254 may comprise circuitry operable to process the signals $d_1$-$d_N$ to recover one or more channels contained in the signals $d_1$-$d_N$. For example, each of the signals $d_1$-$d_N$ may comprise one or more 6 MHz (or 8 MHz) television channels and some guard band. As another example, each of the signals $d_1$-$d_N$ may comprise one or more 20-45 MHz satellite channels and some guard band. The digital processing module 254 may, for example, perform DC offset calibration, I/Q mismatch calibration, channelization, demodulation, error correction, and/or any other digital processing operation necessary and/or desirable for processing the signals $d_1$-$d_N$ to recover one or more selected channels.

The digital processing module 254 may also comprise circuitry operable to packetize data recovered from the one or more selected channels (e.g., one or more MPEG transport streams recovered from the selected channels), and transmit the packets, through the variable rate interpolator (VRI) 256, onto the link 108 utilizing one or more networking protocols. In an exemplary embodiment, the packetized data may be transmitted onto the link 108 utilizing Internet Protocol (IP) and/or Gigabit Ethernet.

The digital processing module 254 may also comprise circuitry operable to provide control signals to the LNB 250 and/or the IF processing module 252. Exemplary control signals include: one or more signals to control a frequency of one or more local oscillators in the LNB 250 and/or the IF processing module 252; one or more signals to control a gain of one or more amplifiers in the LNB 250 and/or the IF processing module 252; one or more signals to control a frequency response of one or more filters in the LNB 250 and/or the IF processing module 252; and/or one or more signals to control a sample rate of one or more ADCs in the LNB 250 and/or the IF processing module 252.

The variable rate interpolator (VRI) 256 may comprise circuitry operable to perform variable rate interpolation functions for the IP-LNB 122. The variable rate interpolator (VRI) 256 may, for example, take an input sequence $\{x(n)\}$ sampled at 1/Ts, and produces an output sequence $\{y(n)\}$ sampled at 1/Ti. The entire operation may be performed digitally and the ratio $\alpha$=Ti/Ts may be any value, rational or irrational, in a particular range. The variable rate interpolator (VRI) 256 may comprise, for example, a finite impulse response (FIR) filter. Additional details of the variable rate interpolator (VRI) 256 are described below with respect to FIG. 2C.

In the exemplary embodiment of the disclosure, although an IP-LNB 122 is illustrated in FIG. 2B, the disclosure may not be so limited. Accordingly, other electronic device such as a channel-stacking LNB may be illustrated without departing from the spirit and scope of various embodiments of the disclosure.

Figure 2C:
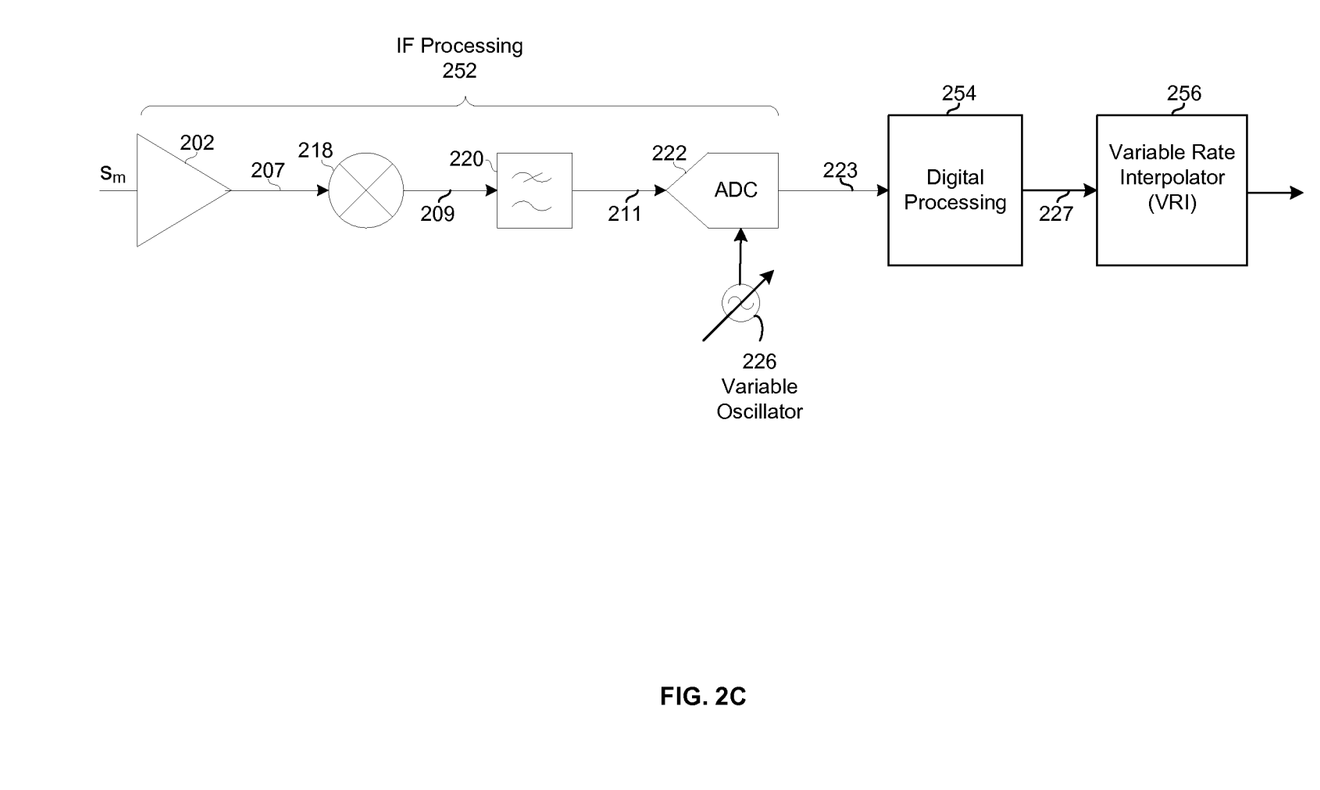
FIG. 2C is a block diagram illustrating an exemplary circuit that is operable to provide full spectrum capture (FSC) sample rate adaptation, in accordance with an embodiment of the invention.

FIG. 2C is a block diagram illustrating an exemplary circuit that is operable to provide full spectrum capture (FSC) sample rate adaptation, in accordance with an embodiment of the invention. Referring to FIG. 2C, there is shown a relevant partial circuit of the IF processing module 252, the digital processing module 254 and the variable rate interpolator (VRI) 256. The partial circuit of the IF processing module 252 may comprise, for example, an amplifier 202 and a wideband path, where the wideband path may comprise a mixer 218, a filter 220, an ADC 222 and a variable oscillator 226. For simplicity, a multiplexer between the amplifier 202 and the mixer 218 is omitted without departing from the spirit and scope of various embodiments of the invention. There is also shown, in FIG. 2C, signals' 207, 209, 211, 223 and 227. The IF processing module 252, the digital processing module 254 and the variable rate interpolator (VRI) 256 may be as described with respect to FIG. 2B, for example.

The amplifier 202 may comprise circuitry operable to amplify and/or buffer an IF signal $s_m$ (where m is an integer less than or equal to M) to generate the signal 207. The amplifiers 202 may be configured to operate in the wideband mode in which it provides at least a threshold amount of gain over a larger bandwidth (e.g., 1.0 or 1.2 GHz). The amplifier 202 may comprise, for example, a low noise amplifier (LNA).

The mixer 218 may comprise circuitry operable to mix the signal 207 with a local oscillator signal (not shown) to generate the signal 209. In an exemplary embodiment, the mixer 218 may be an I/Q mixer which mixes the signal 207 with a pair of phase-quadrature local oscillator signals to generate a pair of phase-quadrature signals 209. The phase and/or frequency of local oscillator signals (not shown) input to the mixer 218 may be controlled via one or more signals from the digital processing module 254.

The filter 220 may comprise circuitry operable to filter out undesired frequencies from the signal 209 to generate the signal 211.

The ADC 222 may comprise circuitry operable to convert the analog signal 211 (which may be two quadrature-phase signals) into the digital signal 223 for further processing by the digital processing module 254. The digital signal 223 may correspond to one of the signals $d_1$-$d_N$ shown in FIG. 2B.

The variable oscillator 226 may comprise circuitry operable to provide variable oscillator signal to the ADC 222 for adaptively varying a sample rate during an analog-to-digital conversion.

In operation, the IF processing module 252 may be operable to sample (e.g., oversample) the signal 211 during an analog-to-digital conversion using the ADC 222, where the signal 211 may comprise a wide bandwidth (e.g., 1.0 GHz) and a plurality of channels (e.g., television or satellite channels). The IF processing module 252 may be operable to adaptively change a sample rate of the sampling to move or push aliasing 232 out of a region or range of one or more desired channels 233 of the plurality of channels. The sample rate may be changed using the variable oscillator 226. In this regard, one or more circuits such as a processor (not shown) in the IP-LNB 122 may be operable to identify, continuously or periodically, the one or more desired channels 233. The one or more circuits (e.g., the processor) may be operable to perform, continuously or periodically, spectrum analysis of the wide bandwidth to monitor signal powers at all frequencies within the wide bandwidth. Based on a result of the spectrum analysis, the aliasing 232 due to the sampling may be determined or identified by the one or more circuits (e.g., the processor). The one or more circuits (e.g., the processor) may be operable to cause the IF processing module 252 to adaptively change, based on the determination of the aliasing 232, the sample rate of the sampling to move the aliasing 232 out of the region of the one or more desired channels 233. The adaptively changed sample rate may be calculated or determined by the one or more circuits (e.g., the processor) via, for example, a firmware algorithm.

In an exemplary embodiment, the change of the sample rate may comprise increasing or decreasing the sample rate by a particular percentage (%). In this regard, for example, a 1% change (increase or decrease) in a sample rate of 3 GHz may result in shifting the aliasing (narrowband blocker) 232 by +/−30 MHz. A 5% change (increase or decrease) in the sample rate of 3 GHz may result in shifting the aliasing (narrowband blocker) 232 by +/−150 MHz. Adaptively choosing the sample rate may result in reducing the oversampling rate and thus, power savings. The digital processing module 254 may be operable to process (e.g., channelize) the signal 223 (with variable sample rate) to generate the signal 227. In response to the change of the sample rate, variable rate interpolation may be performed by the variable rate interpolator (VRI) 256 before the signal 227 is transmitted onto the link 108. In this regard, the variable rate interpolator (VRI) 256 may be utilized to interpolate the samples since the sample rate may have been changed to move the aliasing (narrowband blocker) 232.

Adaptively changing a sample rate of the sampling to move aliasing 232 out of a region of one or more desired channels may bring relaxation of requiring additional filtering device for aliasing, and may result in lower implementation cost due to less hardware complexity.

Although a mixer 218 is illustrated in FIG. 2C, the disclosure may not be so limited. Accordingly, a processing module without a mixer 218 may be illustrated without departing from the spirit and scope of various embodiments of the disclosure. In this regard, such a processing module may operate on real samples instead of I/Q complex samples.

Figure 3:
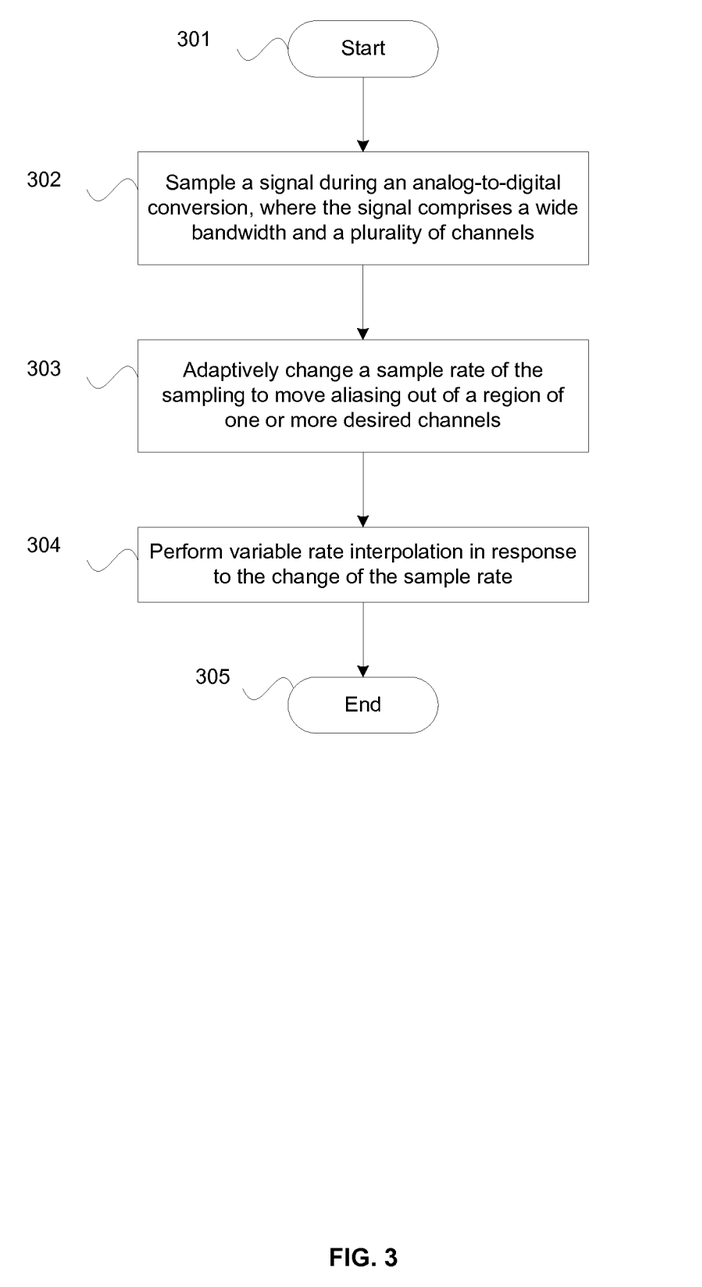
FIG. 3 is a flow chart illustrating exemplary steps for full spectrum capture (FSC) sample rate adaptation, in accordance with an embodiment of the invention.

FIG. 3 is a flow chart illustrating exemplary steps for full spectrum capture (FSC) sample rate adaptation, in accordance with an embodiment of the invention. Referring to FIG. 3, the exemplary steps start at step 301. In step 302, the IF processing module 252 in the electronic device 122 such as the IP-LNB 122 may be operable to sample (e.g., oversample) the signal 211 during an analog-to-digital conversion using the ADC 222 in the electronic device (e.g., the IP-LNB) 122, where the signal 211 may comprise a wide bandwidth (e.g., 1.0 GHz) and a plurality of channels (e.g., television or satellite channels). In step 303, the IF processing module 252 may be operable to adaptively change a sample rate of the sampling to move or push aliasing 232 out of a region or range of one or more desired channels 233 of the plurality of channels. In step 304, the variable rate interpolator (VRI) 256 in the electronic device (e.g., the IP-LNB) 122 may be operable to perform variable rate interpolation in response to the change of the sample rate. The exemplary steps may proceed to the end step 305.

In various embodiments of the invention, an IF processing module 252 in an electronic device such as an IP-LNB 122 may be operable to sample a signal 211 during an analog-to-digital conversion using an ADC 222 in the IF processing module 252, and the signal 211 may comprise a wide bandwidth and a plurality of channels. The IF processing module 252 may be operable to adaptively change a sample rate of the sampling to move aliasing 232 out of a region of one or more desired channels 233 of the plurality of channels. In this regard, the IF processing module 252 may be operable to change the sample rate using a variable oscillator 226 in the IF processing module 252. The change of the sample rate may comprise, for example, increasing or decreasing the sample rate by a particular percentage. In response to the change of the sample rate, the electronic device (e.g., the IP-LNB) 122 may be operable to perform, using a variable rate interpolator (VRI) 256 in the electronic device 122, variable rate interpolation. In this regard, the variable rate interpolator (VRI) 256 may comprise, for example, a FIR filter.

The sampling of the signal 211 may comprise, for example, an oversampling. The wide bandwidth of the signal 211 may be, for example, approximately 1 GHz. A bandwidth of each of the plurality of channels may be, for example, approximately in the range of 6 to 45 MHz. The signal 211 or 230 may comprise, for example, a satellite television signal.

One or more circuits such as a processor in the electronic device (e.g., the IP-LNB) 122 may be operable to identify, continuously or periodically, the one or more desired channels 233. The one or more circuits (e.g., the processor) may be operable to perform, continuously or periodically, spectrum analysis of the wide bandwidth to monitor signal powers at all frequencies within the wide bandwidth. Based on a result of the spectrum analysis, the aliasing 232 due to the sampling may be determined or identified by the one or more circuits (e.g., the processor). Caused by the one or more circuits (e.g., the processor), the IF processing module 252 may be operable to adaptively change, based on the determination of the aliasing 232, the sample rate of the sampling to move the aliasing 232 out of the region of the one or more desired channels 233.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for full spectrum capture sample rate adaptation.

Accordingly, aspects of the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in an electronic device:
selecting from a plurality of signal paths, at least one signal path for handling a wideband signal, wherein:
the wideband signal comprises a wide bandwidth and a plurality of channels, and
the at least one signal path is configurable as a narrowband path or a wideband path;
configuring the at least one signal path as a wideband path, to handle processing of the wideband signal, wherein:
the processing comprises applying sampling to the wideband signal based on a sample rate; and
the configuring comprises adaptively setting the sample rate;
generating, based on processing of the wideband signal via the configured at least one signal path, an output corresponding to the wideband signal, wherein the output comprises data obtained based on the sampling of the wideband signal;
performing spectrum analysis of the wide bandwidth;
monitoring based on the spectrum analysis, signal power at all frequencies within the wide bandwidth; and
controlling setting of the sample rate based on the monitoring of signal power at all frequencies within the wide bandwidth.

2. The method according to claim 1, comprising setting the sample rate using a variable oscillator in the electronic device.

3. The method according to claim 1, wherein the setting of the sample rate comprises increasing or decreasing the sample rate by a particular percentage.

4. The method according to claim 1, wherein the wide bandwidth of the wideband signal is approximately 1 gigahertz (GHz).

5. The method according to claim 1, wherein a bandwidth of each of the plurality of channels is approximately in the range of 6 to 45 megahertz (MHz).

6. The method according to claim 1, wherein the wideband signal comprises a satellite television signal.

7. The method according to claim 1, wherein the electronic device comprises an Internet protocol low noise block downconverter (IP-LNB).

8. The method according to claim 1, comprising:
identifying, continuously or periodically, one or more desired channels of the plurality of channels;
determining, based on a result of the spectrum analysis, aliasing due to the sampling; and
adaptively setting, based on the determination of the aliasing, the sample rate of the sampling to move the aliasing out of a region of the one or more desired channels.

9. A system, comprising:
an electronic device, the electronic device being operable to:
select from a plurality of signal paths, at least one signal path for handling a wideband signal, wherein:
the wideband signal comprises a wide bandwidth and a plurality of channels, and
the at least one signal path is configurable as narrowband path or wideband path; and
configure the at least one signal path as a wideband path, to handle processing of the wideband signal, wherein:
the processing comprises applying sampling to the wideband signal based on a sample rate; and
configuring comprises adaptively setting the sample rate;
generate, based on processing of the wideband signal via the configured at least one signal path, wherein the output comprises data obtained based on the sampling of the wideband signal;
perform spectrum analysis of the wide bandwidth;
monitor based on the spectrum analysis, signal power at all frequencies within the wide bandwidth; and
control setting of the sample rate based on the monitoring of signal power at all frequencies within the wide bandwidth.

10. The system according to claim 9, wherein the electronic device is operable to set the sample rate using a variable oscillator in the electronic device.

11. The system according to claim 9, wherein the setting of the sample rate comprises increasing or decreasing the sample rate by a particular percentage.

12. The system according to claim 9, wherein the wide bandwidth of the wideband signal is approximately 1 gigahertz (GHz).

13. The system according to claim 9, wherein a bandwidth of each of the plurality of channels is approximately in the range of 6 to 45 megahertz (MHz).

14. The system according to claim 9, wherein the wideband signal comprises a satellite television signal.

15. The system according to claim 9, wherein the electronic device comprises an Internet protocol low noise block downconverter (IP-LNB).

16. The system according to claim 9, wherein the electronic device is operable to:
   identify, continuously or periodically, one or more desired channels of the plurality of channels;
   determine, based on a result of the spectrum analysis, aliasing due to the sampling; and
   adaptively set, based on the determination of the aliasing, the sample rate of the sampling to move the aliasing out of a region of the one or more desired channels.

17. The method of claim 1, comprising:
   controlling generating the output based on the adaptive changing of the sample rate, wherein the controlling comprises performing variable rate interpolation, using a variable rate interpolator in the electronic device; and
   configuring the variable rate interpolation based on changes of the sample rate.

18. The system according to claim 9, wherein the electronic device is operable to control generating the output based on the adaptive changing of the sample rate, wherein the controlling comprises performing, using a variable rate interpolator in the electronic device, the variable rate interpolator being configured based on the change of the sample rate.

19. The method according to claim 17, wherein the variable rate interpolator comprises a finite impulse response (FIR) filter.

20. The system according to claim 18, wherein the variable rate interpolator comprises a finite impulse response (FIR) filter.

21. The method according to claim 1, comprising adaptively setting the sample rate to move aliasing out of a region of one or more desired channels of the plurality of channels.

22. The system according to claim 9, wherein the electronic device is operable to adaptively set the sample rate to move aliasing out of a region of one or more desired channels of the plurality of channels.

* * * * *